United States Patent
Kuhnle et al.

(10) Patent No.: US 7,950,266 B2
(45) Date of Patent: May 31, 2011

(54) METHOD AND APPARATUS FOR FLUID PRESSURE TESTING

(75) Inventors: Carl Kuhnle, Waco, TX (US); David Monteith, Thomasville, GA (US); Robert E. Wallace, Waco, TX (US); Jessie L. Garrett, Jr., Apopka, FL (US)

(73) Assignee: The Wallace Group, Inc., Waco, TX (US)

( * ) Notice: Subject to any disclaimer, the term of this patent is extended or adjusted under 35 U.S.C. 154(b) by 272 days.

(21) Appl. No.: 12/013,552

(22) Filed: Jan. 14, 2008

(65) Prior Publication Data

US 2009/0178463 A1 Jul. 16, 2009

(51) Int. Cl.
*G01L 27/00* (2006.01)
(52) U.S. Cl. .......................................... 73/1.72
(58) Field of Classification Search ............... 73/1.72
See application file for complete search history.

(56) References Cited

U.S. PATENT DOCUMENTS

| | | | | |
|---|---|---|---|---|
| 3,768,299 A | * | 10/1973 | Garren | 73/1.72 |
| 4,852,387 A | | 8/1989 | Bingham | |
| 4,893,494 A | | 1/1990 | Hart | |
| 5,613,513 A | * | 3/1997 | Makowan | 137/1 |
| 5,856,615 A | | 1/1999 | Easter | |
| 7,418,998 B2 | * | 9/2008 | Aoki et al. | 165/104.33 |

* cited by examiner

*Primary Examiner* — Hezron Williams
*Assistant Examiner* — Alex Devito
(74) *Attorney, Agent, or Firm* — Patterson & Sheridan, L.L.P.

(57) ABSTRACT

A method and apparatus for testing the functionality of automatic air valves positioned at high points of a pipeline system are provided. The invention generally provides a testing flange and a process for performing various fluid pressure tests to determine whether automatic air valves are properly releasing and/or stabilizing air within a pipeline system.

14 Claims, 5 Drawing Sheets

METHOD AND APPARATUS FOR FLUID PRESSURE TESTING

BACKGROUND OF THE INVENTION

1. Field of the Invention

Embodiments of the present invention generally relate to an apparatus and process for field testing automatic air valves in water and wastewater pipeline systems.

2. Description of the Related Art

The operation of water and wastewater pipeline systems may be severely impacted by the presence of air trapped in the pipeline. In fact, failure to properly de-aerate the line may lead to pump, valve, and pipe failures as well as faulty instrument readings.

Air in a pressurized, operating pipeline comes from three primary sources: air initially present in the line prior to startup, air or gas contained or generated within the water or wastewater itself, and air that enters the line through mechanical equipment.

Regardless of the source, the air present in the line tends to accumulate at high points in the line. This condition may lead to a host of problems in the pipeline, including line restriction, flow stoppage, or high pressure surge (water hammer).

In addition to the problem of trapped air in water and wastewater pipelines, vacuum or siphoning of the line may occur during a system shut down or failure. Such a condition may lead to line collapse or intensified surges in the pipeline.

To help alleviate the existence of trapped air or vacuum in water and wastewater pipeline systems, most municipalities employ automatic air valves at the high points in the line. Types of automatic air valves include air/vacuum valves, air release valves and combination air valves.

An air/vacuum valve exhausts large quantities of air upon system start-up, as well as allowing air to re-enter the line upon system shut down or system failure. As water enters an air/vacuum valve, a float rises, closing a discharge port. The port, and hence the valve, will remain closed until the air pressure in the valve drops to atmospheric pressure. Furthermore, if a negative pressure develops in the line, the valve opens, admitting air into the line and preventing the deleterious effect of vacuum or siphoning in the system.

An air release valve continuously releases accumulated air during system operation. Similar to the air/vacuum valve, a float closes a discharge port as the water rises in the valve. During operation, as air from the line enters the valve, it displaces the water. As a result, a float drops from its sealed position against the discharge port, allowing the air to release to the atmosphere. As the air is vented, it is replaced by water, raising the float and closing the valve. As air accumulates, the valve continues to cycle in this manner to remove the collected air.

A combination air valve performs the functions of both an air/vacuum valve and an air release valve. Therefore, the combination air valve exhausts large quantities of air on start-up, admits air on shutdown or failure, and releases air continuously during operation.

However, as important as these valves are to the proper functioning and life of water and wastewater pipeline systems, a shortage of apparatus and procedures exist for ensuring proper functioning of these valves in the field. Accordingly, a need exists for improved apparatus and processes for testing automatic air valves in water and wastewater pipeline systems.

SUMMARY OF THE INVENTION

The present invention generally relates to an apparatus and process for field testing the functioning of automatic air valves in water and wastewater pipeline systems.

In one embodiment, a process for field testing an automatic air valve connected to a testing apparatus in fluid communication with an auxiliary valve situated at a pipeline system high point comprises closing the auxiliary valve, draining the testing apparatus, applying pressurized air to the testing apparatus, monitoring the testing apparatus, and determining whether the automatic air valve is releasing air.

In another embodiment, a process for field testing an automatic air valve connected to a testing apparatus in fluid communication with an auxiliary valve situated at a pipeline system high point comprises closing the auxiliary valve, draining the testing apparatus, applying pressurized air to the testing apparatus, monitoring the testing apparatus, determining whether the automatic air valve is releasing air, applying a test fluid to the testing apparatus, monitoring the testing apparatus and the air valve, and determining whether the automatic air valve is closing.

In another embodiment, a process for field testing an automatic air valve connected to a testing apparatus in fluid communication with an auxiliary valve situated at a pipeline system high point comprises closing the auxiliary valve, applying a vacuum to the testing apparatus, monitoring the testing apparatus and the air valve, and determining whether the air valve is allowing air to enter the testing apparatus.

In yet another embodiment, an apparatus for connection with a pipeline system comprises a flange member having an inner body portion in fluid communication with first and second flange openings, the first flange opening being for connection with the pipeline system, the second flange opening being in connection with an automatic air valve, a first fluid port in fluid communication with the inner body portion of the flange member, a first stop valve in fluid communication with the first fluid port, a second fluid port in fluid communication with the inner body portion of the flange member, and a gauge in fluid communication with the second fluid port.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally relates to an apparatus and process for field testing the functioning of automatic air valves in water and wastewater pipeline systems.

Figure 1A:
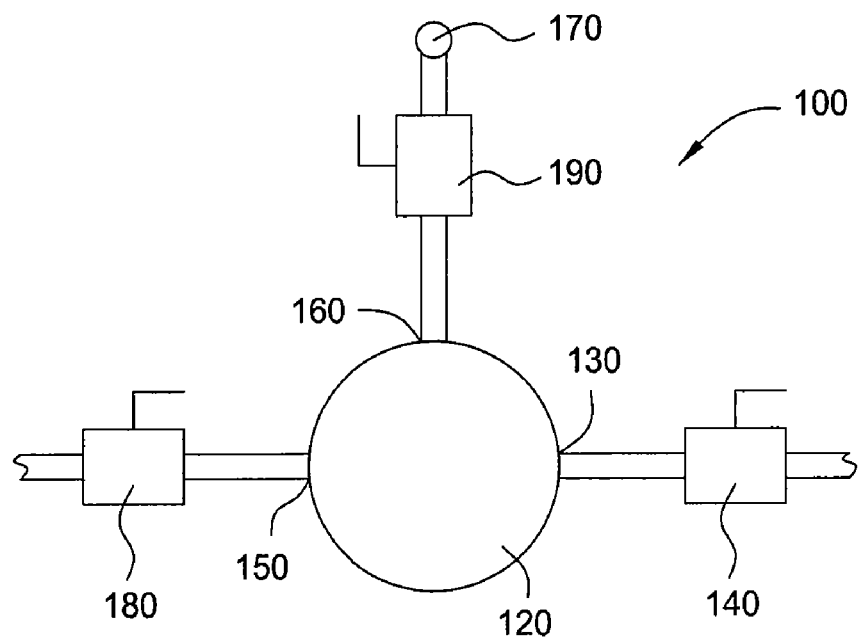
FIG. 1A is a schematic top view of an embodiment of the present invention.
Figure 1B:
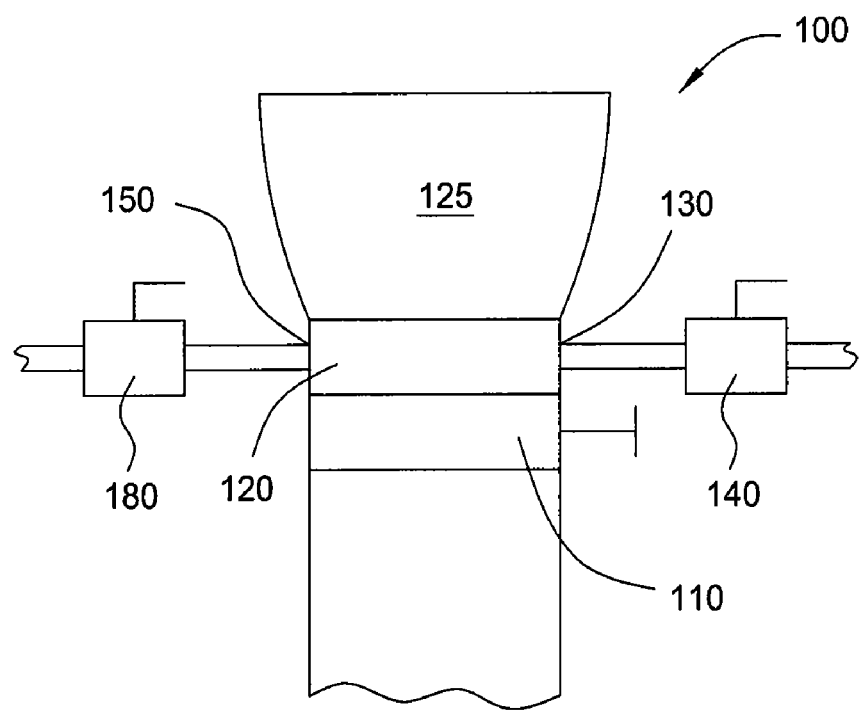
FIG. 1B is a schematic front view of the embodiment depicted in FIG. 1A.
Figure 2:
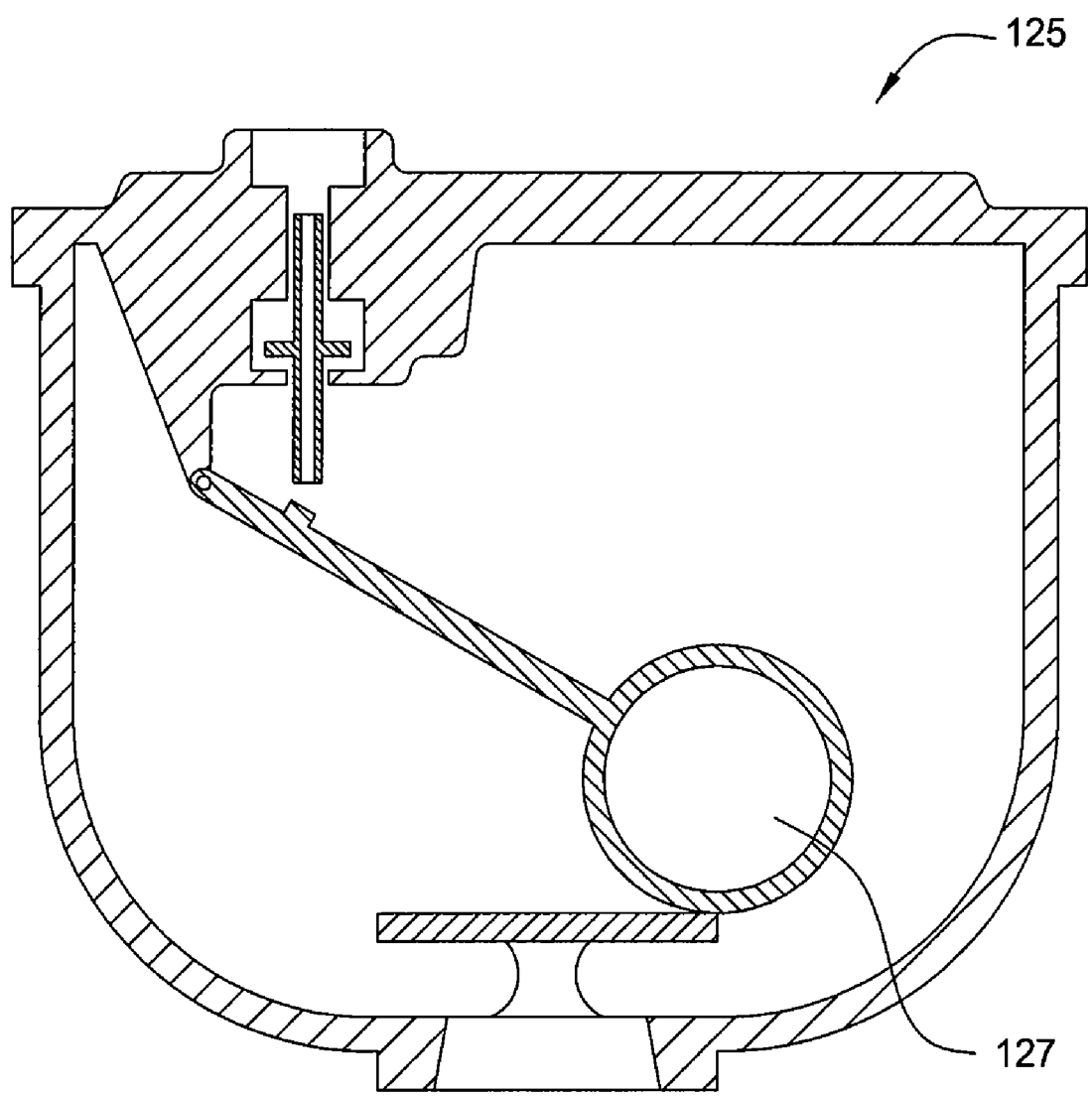
FIG. 2 is a schematic, cross-sectional front view of an exemplary air valve that may be used with the present invention.

FIG. 1A is a schematic top view and FIG. 1B is a schematic front view of an embodiment of an apparatus 100 for field testing automatic air valves in water and wastewater pipeline systems. An auxiliary shut-off valve 110 may be positioned to extend from a pipeline system high point, where trapped air tends to accumulate. A test flange 120 may be positioned between auxiliary shut-off valve 110 and an automatic air valve 125 (omitted from FIG. 1A for clarity of other features of the invention). A cross-sectional, front view of an exemplary air valve 125 is shown in FIG. 1C. The automatic air valve 125 may have a float component 127 for closing and opening the air and/or vacuum release portion of air valve 125. The automatic air valve 125 may be an air/vacuum valve, an air relief valve, a combination air valve, or other air valve for relieving trapped air and/or vacuum situations within the pipeline system.

Figure 3:
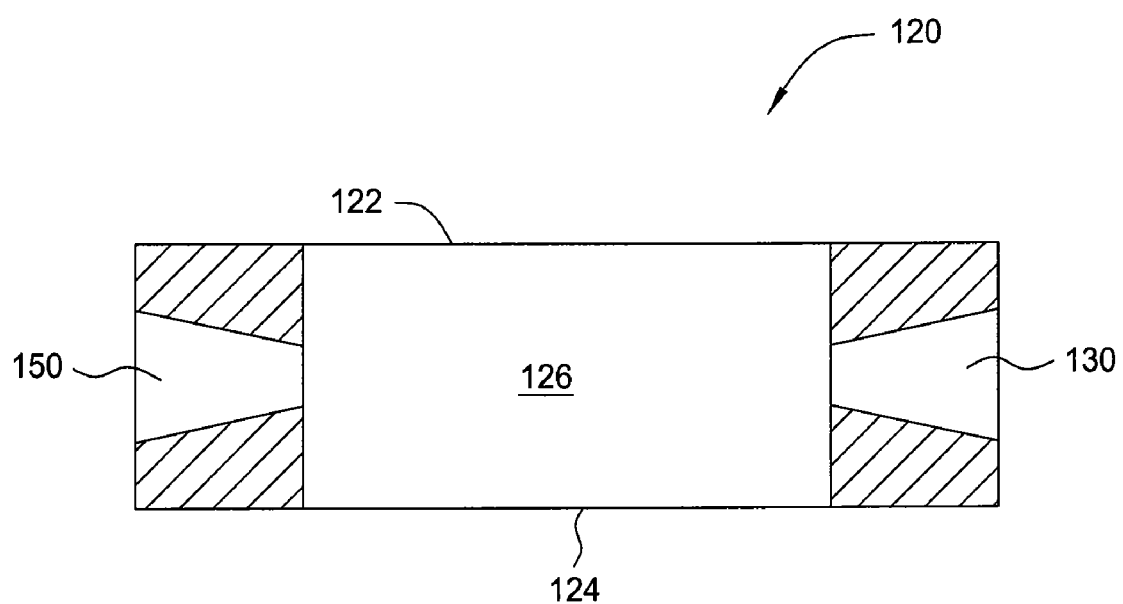
FIG. 3 is a schematic, cross-sectional front view of an embodiment of the test flange in FIGS. 1A and 1B.

A schematic, cross-sectional front view of an embodiment of the test flange 120 is shown in FIG. 3. The test flange 120 may have a first opening 122 in fluid communication with a second opening 124 via an inner body portion 126. The test flange 120, for example, may be a two inch diameter flange having an outer diameter of six inches and a bolt-hole circle pattern diameter of 4-¾ inches. The test flange 120 may further include a port 130 for introducing fluid into or removing fluid from the test flange 120. The port 130 may be any size and configuration conventional in the art for connecting a fluid conduit member. As an example, port 130 may be drilled and tapped for a one inch NPT pipe fitting.

A stop valve 140 may be connected in line with the port 130 for allowing or preventing external fluid communication with the port 130. The stop valve 140 may be any of a variety of valves known in the art for shutting off fluid flow, such as a ball valve, a gate valve, or a butterfly valve.

Test flange 120 may have a test port 160 in fluid communication with the inner body portion 126 and configured for connection with a gauge 170. Test port 160 may be any size or configuration conventional in the art for connecting to a fluid conduit member. For example, test port 160 may be drilled and tapped for a one inch NPT pipe fitting. The gauge 170 may be any of a variety of gauges used in fluid systems for determining operating parameters such as the existing pressure in the system.

A stop valve 190 may be positioned between the port 160 and the gauge 170. The stop valve 190 may be any of a variety of valves known in the art for shutting off fluid flow, such as a ball valve, a gate valve, or a butterfly valve.

The test flange 120 may include an additional port 150 in fluid communication with the inner body portion 126. Port 150 may also be any size or configuration conventional in the art for connecting a fluid conduit member. For instance, port 150 may be drilled and tapped for a one inch NPT pipe fitting.

Additionally, a stop valve 180 may be connected in line with the port 150 for allowing or preventing external fluid communication with the port 150. The stop valve 180 may be any of a variety of valves known in the art for shutting off fluid flow, such as a ball valve, a gate valve, or a butterfly valve.

Figure 4:
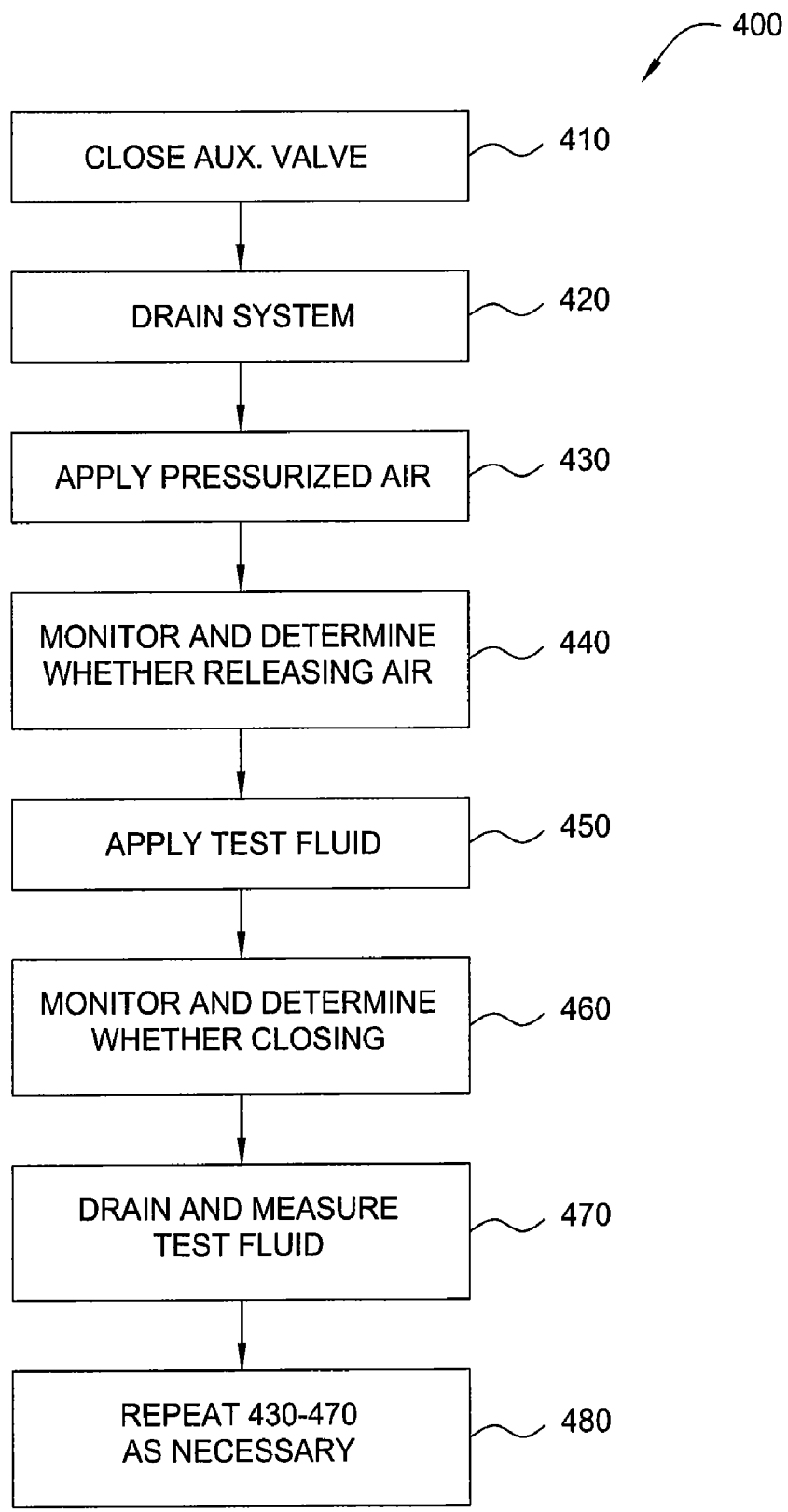
FIG. 4 is a flow diagram of an embodiment of a process of the present invention.

FIG. 4 is a flow diagram of an embodiment of a process 400 for field testing an automatic air valve 125 in a water or wastewater pipeline system. One embodiment of process 400 pertains to an embodiment of the apparatus 100 wherein the port 150 and stop valve 180 are not provided.

In step 410, the auxiliary valve 110 may be closed to shut off flow from the pipeline.

In step 420, the stop valve 140 may be opened and water drained from the system. The stop valve 140 may then be closed.

In step 430 a pressurized air source may be connected to the stop valve 140. Pressurized air may be supplied to the stop valve 140 via the pressurized air source, and the stop valve 140 may be shifted to the open position to allow the pressurized air to flow into the air valve 125 through the test flange 120. Pressurized air may be supplied at a pressure of about 25 psi to about 250 psi.

In step 440, the air valve 125 and the gauge 170 may be monitored to determine whether the air valve 125 is properly relieving air pressure. That is, if the air pressure in the system rises and is not released through the air valve 125, the air valve 125 is not functioning properly. Conversely, if the air pressure in the system is released through the air valve 125, the air valve 125 is releasing air properly.

If the air valve 125 is releasing air properly, optional steps may be added to determine whether air valve 125 is closing properly.

In optional step 450, the stop valve 140 may be closed and the air source removed. In its place, a test fluid source, such as water, may be connected in line with the stop valve 140, and the stop valve 140 may be opened.

In optional step 460, the air valve 125 and the gauge 170 may be monitored to determine whether air valve 125 is closing properly. For example, if test fluid leaks out of the air valve 125 as the system fills with test fluid, the air valve 125 is not closing properly. However, if the air valve releases air as the system fills with test fluid, but the test fluid does not leak out of the valve once the system is full of test fluid, the air valve 125 is closing properly. Further, in step 460, the air valve 125 may be visually monitored to determine whether any leaks exist in the system.

In optional step 470, the stop valve 140 may be closed and the test fluid source removed. The stop valve 140 may then be opened, and test fluid from the system may be drained and measured to determine whether the float component 127 of air valve 125 is properly inflated. For example, if the volume of test fluid removed from the system approximately equals the known volume of the flange 120/air valve 125 combination, then the float component is properly inflated. However, if the volume of test fluid removed is greater than the flange 120/air valve 125 combination, then the float component is not properly inflated.

In optional step 480, the stop valve 140 may be closed and steps 430-470 may be repeated as necessary to ensure air valve 125 is functioning properly.

Another embodiment of process 400 pertains to an embodiment of apparatus 100 wherein port 150 and stop valve 180 are provided.

In step 410, the auxiliary valve 110 may be closed to shut off flow from the pipeline.

In step 420, the stop valve 140 may be opened and water drained from the system. The stop valve 140 may then be closed.

In step 430 a pressurized air source may be connected to the stop valve 140. Pressurized air may be supplied to the stop valve 140 via the pressurized air source, and the stop valve 140 may be shifted to the open position to allow the pressurized air to flow into the air valve 125 through the test flange 120. Pressurized air may be supplied at a pressure of about 25 psi to about 250 psi.

In step 440, the air valve 125 and the gauge 170 may be monitored to determine whether the air valve 125 is properly relieving air pressure. That is, if the air pressure in the system rises and is not released through the air valve 125, the air valve 125 is not functioning properly. Conversely, if the air pressure in the system is released through the air valve 125, the air valve 125 is releasing air properly.

If the air valve 125 is releasing air properly, optional steps may be added to determine whether air valve 125 is closing properly.

In optional step 450, the stop valve 140 may be closed, and a test fluid source, such as water, may be connected in line with the stop valve 180. The stop valve 180 may then be opened.

In optional step 460, the air valve 125 and the gauge 170 may be monitored to determine whether air valve 125 is closing properly. For example, if test fluid leaks out of the air valve 125 as the system fills with water, the air valve 125 is not closing properly. However, if the air valve releases air as the system fills with water, but the test fluid does not leak out of the valve once the system is full of test fluid, the air valve 125 is closing properly. Further, in step 460, the air valve 125 may be visually monitored to determine whether any leaks exist in the system.

In optional step 470, the stop valve 180 may be closed and the test fluid source removed. The stop valve 180 may then be opened, and the test fluid from the system may be drained and measured to determine whether the float component 127 of air valve 125 is properly inflated. For example, if the volume of test fluid removed from the system approximately equals the known volume of the flange 120/air valve 125 combination, then the float component is properly inflated. However, if the volume of test fluid removed is greater than the known value of the flange 120/air valve 125 combination, then the float component is not properly inflated.

In optional step 480, the stop valve 180 may be closed and steps 430-470 may be repeated as necessary to ensure air valve 125 is functioning properly.

Figure 5:
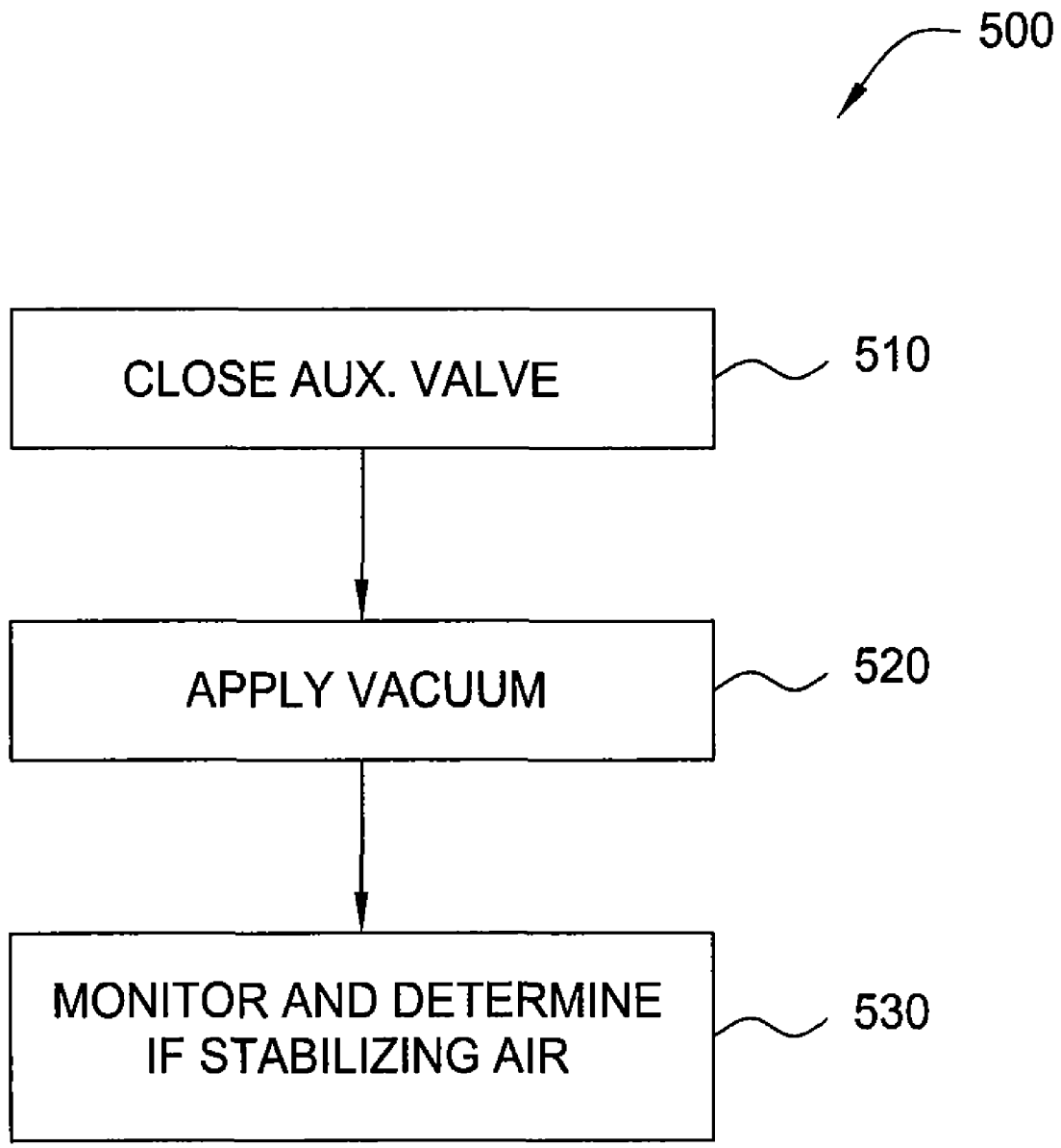
FIG. 5 is a flow diagram of another embodiment of a process of the present invention.

FIG. 5 is a flow diagram of another embodiment of a process 500 for field testing an automatic air valve 125 in a water or wastewater pipeline system.

In step 510, the auxiliary valve 110 may be closed to shut off flow from the pipeline.

In step 520 a negative pressure or vacuum source may be connected to the stop valve 140 in line with the inlet port 130, and negative pressure may be supplied to the stop valve 140 via the pressurized air source. Negative pressure may be supplied at a pressure of from about 0 psi to about −15 psi. The stop valve 140 may be shifted to the open position to allow the negative pressure to flow from the air valve 125 through the test flange 120.

In step 530, the air valve 125 and the gauge 170 may be monitored to determine whether air valve 125 is properly relieving negative pressure. That is, if the air pressure in the system falls and is not stabilized through the air valve 125, the air valve 125 is not functioning properly. Conversely, if the negative pressure in the system is stabilized through the air valve 125, the air valve 125 is allowing air into the system properly.

While the foregoing is directed to embodiments of the present invention, other and further embodiments of the invention may be devised without departing from the basic scope thereof, and the scope thereof is determined by the claims that follow.

The invention claimed is:

1. A process for field testing an automatic air valve connected to a testing apparatus in fluid communication with an auxiliary valve situated at a pipeline system high point, comprising:
    closing the auxiliary valve;
    draining the testing apparatus;
    applying pressurized air to the testing apparatus;
    monitoring the testing apparatus while applying the pressurized air;
    determining whether the automatic air valve is releasing air while applying the pressurized air;
    applying a test liquid to the testing apparatus;
    monitoring the testing apparatus and the air valve while applying the test liquid; and
    determining whether the automatic air valve is closing such that air is released from the automatic air valve and the test liquid is retained by the automatic air valve while applying the test liquid.

2. The process of claim 1, wherein the testing apparatus comprises:
    a flange member having an inner body portion in fluid communication with a first and second flange openings, the first flange opening being in fluid communication with the auxiliary valve, the second flange opening being in fluid communication with the automatic air valve;
    a first fluid port in fluid communication with the inner body portion of the flange member;
    a first stop valve in fluid communication with the first fluid port;
    a second fluid port in fluid communication with the inner body portion of the flange member; and
    a gauge in fluid communication with the second fluid port.

3. The process of claim 2 wherein the applying pressurized air comprises connecting a pressurized air source in fluid communication with the first stop valve and opening the first stop valve.

4. The process of claim 2 wherein the monitoring the testing apparatus comprises monitoring the gauge for rising pressure.

5. The process of claim 2 wherein the testing apparatus further comprises:
    a third fluid port in fluid communication with the inner body portion of the flange member; and
    a third stop valve in fluid communication with the third fluid port.

6. The process of claim 5 wherein the applying test liquid comprises connecting a water source in fluid communication with the third stop valve and opening the third stop valve.

7. The process of claim 5 wherein the monitoring the testing apparatus and the air valve comprises monitoring the testing apparatus and the air valve for liquid leaks.

8. The process of claim 5 further comprising draining and measuring the volume of liquid in the testing apparatus and the automatic air valve.

9. A process for field testing an automatic air valve connected to a testing apparatus in fluid communication with an auxiliary valve situated at a pipeline system high point, comprising:
    closing the auxiliary valve;
    draining the testing apparatus;
    applying pressurized air to the testing apparatus;
    monitoring the testing apparatus for rising pressure while applying the pressurized air;
    determining whether the automatic air valve is releasing air while applying the pressurized air;
    applying a test liquid to the testing apparatus;
    monitoring the testing apparatus and the air valve for liquid leaks while applying the test liquid; and
    determining whether the automatic air valve is closing such that air is released from the automatic air valve and the test liquid is retained by the automatic air valve while applying the test liquid.

10. The process of claim 9, wherein the testing apparatus comprises:

a flange member having an inner body portion in fluid communication with a first and second flange openings, the first flange opening being in fluid communication with the auxiliary valve, the second flange opening being in fluid communication with the automatic air valve;

a first fluid port in fluid communication with the inner body portion of the flange member;

a first stop valve in fluid communication with the first fluid port;

a second fluid port in fluid communication with the inner body portion of the flange member;

a gauge in fluid communication with the second fluid port;

a third fluid port in fluid communication with the inner body portion of the flange member; and a third stop valve in fluid communication with the third fluid port.

11. The process of claim 10, wherein the applying test liquid comprises connecting a water source in fluid communication with the third stop valve and opening the third stop valve.

12. A process for field testing an automatic air valve connected to a testing apparatus in fluid communication with an auxiliary valve situated at a pipeline system high point, comprising:

closing the auxiliary valve;
draining the testing apparatus;
applying pressurized air to the testing apparatus;
monitoring the testing apparatus for rising pressure while applying the pressurized air;
determining whether the automatic air valve is releasing air while applying the pressurized air;
applying a test liquid to the testing apparatus;
monitoring the testing apparatus and the air valve for liquid leaks while applying the test liquid;
determining whether the automatic air valve is closing such that air is released from the automatic air valve and the test liquid is retained by the automatic air valve while applying the test liquid; and
draining and measuring the volume of liquid in the testing apparatus and the automatic air valve.

13. The process of claim 12, wherein the testing apparatus comprises:

a flange member having an inner body portion in fluid communication with a first and second flange openings, the first flange opening being in fluid communication with the auxiliary valve, the second flange opening being in fluid communication with the automatic air valve;

a first fluid port in fluid communication with the inner body portion of the flange member;

a first stop valve in fluid communication with the first fluid port;

a second fluid port in fluid communication with the inner body portion of the flange member;

a gauge in fluid communication with the second fluid port;

a third fluid port in fluid communication with the inner body portion of the flange member; and a third stop valve in fluid communication with the third fluid port.

14. The process of claim 13, wherein the applying test liquid comprises connecting a water source in fluid communication with the third stop valve and opening the third stop valve.

* * * * *